(12) United States Patent
Friedlander et al.

(10) Patent No.: US 8,914,748 B2
(45) Date of Patent: *Dec. 16, 2014

(54) METHOD AND APPARATUS FOR AUTOMATICALLY UPDATING A PRIMARY DISPLAY AREA

(75) Inventors: Steven Friedlander, San Diego, CA (US); Hyehoon Yi, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 493 days.

This patent is subject to a terminal disclaimer.

(21) Appl. No.: 13/346,909

(22) Filed: Jan. 10, 2012

(65) Prior Publication Data

US 2012/0110457 A1     May 3, 2012

Related U.S. Application Data

(63) Continuation of application No. 12/382,324, filed on Mar. 13, 2009, now Pat. No. 8,136,051.

(51) Int. Cl.
| | |
|---|---|
| *G06F 15/00* | (2006.01) |
| *G06F 13/00* | (2006.01) |
| *G06F 3/0481* | (2013.01) |
| *H04N 5/44* | (2011.01) |
| *H04N 21/422* | (2011.01) |
| *H04N 21/431* | (2011.01) |
| *H04N 21/4788* | (2011.01) |

(52) U.S. Cl.
CPC ............ *G06F 3/0481* (2013.01); *H04N 5/4403* (2013.01); *H04N 21/42203* (2013.01); *H04N 21/42204* (2013.01); *H04N 21/4221* (2013.01); *H04N 21/4316* (2013.01); *H04N 2005/4428* (2013.01); *H04N 21/4788* (2013.01)
USPC ....................................................... 715/830

(58) Field of Classification Search
CPC ............................ G06F 3/0481; H04N 5/4403
USPC ......... 715/716, 803, 856, 780–781, 761–765, 715/830–833, 851–853; 345/418, 475
See application file for complete search history.

(56) References Cited

U.S. PATENT DOCUMENTS

| | | | | |
|---|---|---|---|---|
| 6,756,997 | B1 * | 6/2004 | Ward et al. ..................... | 715/716 |
| 6,889,384 | B1 | 5/2005 | Soloff | |

(Continued)

FOREIGN PATENT DOCUMENTS

GB           2428153 A      1/2007

OTHER PUBLICATIONS

T. Kunert, "An User Task and User Requirement Based Approach to Interaction Design Patterns," Workshop on Human-Computer Interaction (HCI) Design Patterns at the 10th IFIP TC13 International Conference on Human-Computer Interaction "Interact 2005—Communicating Naturally through Computers", Sep. 12-16, 2005, Rome, Italy.

*Primary Examiner* — Cao "Kevin" Nguyen
(74) *Attorney, Agent, or Firm* — Haverstock & Owens LLP

(57) ABSTRACT

Receiving commands from a remote controller and automatically activating display areas for cursor navigation. Content display areas within a display frame respectively correspond to a variety of content items and include a primary display area wherein cursor navigation is activated and secondary display areas wherein cursor navigation is prevented. Remote controller navigational commands, for example, then allow cursor based navigation for the content item currently displayed in the primary display area. A content selection command such as a number key input of the remote controller allows immediate and automatic updating of the primary display area to include a desired content item that is associated to the command (e.g., the particular number).

15 Claims, 15 Drawing Sheets

(56) References Cited

U.S. PATENT DOCUMENTS

| | | |
|---|---|---|
| 7,302,647 B2 * | 11/2007 | Sekiguchi et al. ............ 715/781 |
| 2006/0290817 A1 | 12/2006 | Yui et al. |
| 2007/0262953 A1 | 11/2007 | Zackschewski |
| 2008/0043094 A1 | 2/2008 | Ijzerman et al. |
| 2009/0138820 A1 * | 5/2009 | Lockhart et al. .............. 715/803 |

* cited by examiner

METHOD AND APPARATUS FOR AUTOMATICALLY UPDATING A PRIMARY DISPLAY AREA

CROSS REFERENCE TO RELATED APPLICATIONS

This is a Continuation Application of U.S. patent application Ser. No. 12/382,324, filed Mar. 13, 2009, entitled "Method and Apparatus for Automatically Updating a Primary Display Area" listing the same inventors, the disclosure of which is hereby incorporated by reference.

BACKGROUND OF THE INVENTION

1. Field of the Invention

This invention relates generally to content navigation and more particularly to a method and apparatus for selecting and focusing upon content items for navigation.

2. Description of the Related Art

A variety of content is increasingly being accessed in the traditional "television" environment, including not only traditional programming content, but also related internet content, personal content, recorded content, etc. It would be desirable to allow users to fully and conveniently enjoy program content while simultaneously engaging in online activities.

Ordinarily, a personal computer user may use a full keyboard and mouse function in order to navigate among and select content items resident on a display screen.

However, a television user typically uses a remote commander having different inputs, and a limited number of keys. Thus, in a situation where a user is navigating among various content items using a remote commander, it can be difficult for the user to select which of several possible content items a navigational (or other) command should be directed to.

It would thus be beneficial to accommodate convenient selection of content items and corresponding navigation of selected content items, using a remote controller in lieu of a full keyboard and mouse typically used in a personal computing environment.

SUMMARY OF THE INVENTION

The present invention allows the receipt of commands from a remote controller, to automatically focus upon selected content items, with cursor navigation being available for the selected content item while it is resident in a primary display area.

In one example, multiple content display areas within a display frame respectively correspond to a variety of content items and include a primary display area wherein cursor navigation is activated and secondary display areas wherein cursor navigation is prevented. Remote controller navigational commands then allow cursor based navigation for the content item currently displayed in the primary display area.

A content selection command such as a number key input of the remote controller allows immediate and automatic updating of the primary display area to include a desired content item that is associated to the command (e.g., the particular number).

Once the primary display area is updated, the new desired content item may be freely navigated using the cursor commands of the remote controller, or the like.

This accommodates navigating among various content items using available input keys of the remote controller, in situations where a user may be operating a display device using the remote controller in lieu of a more extensive interface device.

In another example, content display areas are displayed concurrently, and at least one of those content display areas is determined to be a first focused display area wherein cursor navigation is allowed, while preventing cursor navigation in the remaining content display areas. A numerical input command is received and associated to one of the remaining content display areas, and it is determined that the content display area associated with the numerical input command is a second (new) focused display area, with cursor navigation allowed therein while preventing cursor navigation in the remaining content display areas.

The plurality of content display areas may again comprise a primary display area and secondary display areas. A selection command corresponding to a selectable item within the second focused display area (being one of the secondary display areas) is then received, and content corresponding to the selectable item is launched within the primary display area.

The present invention can be embodied in various forms, including computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
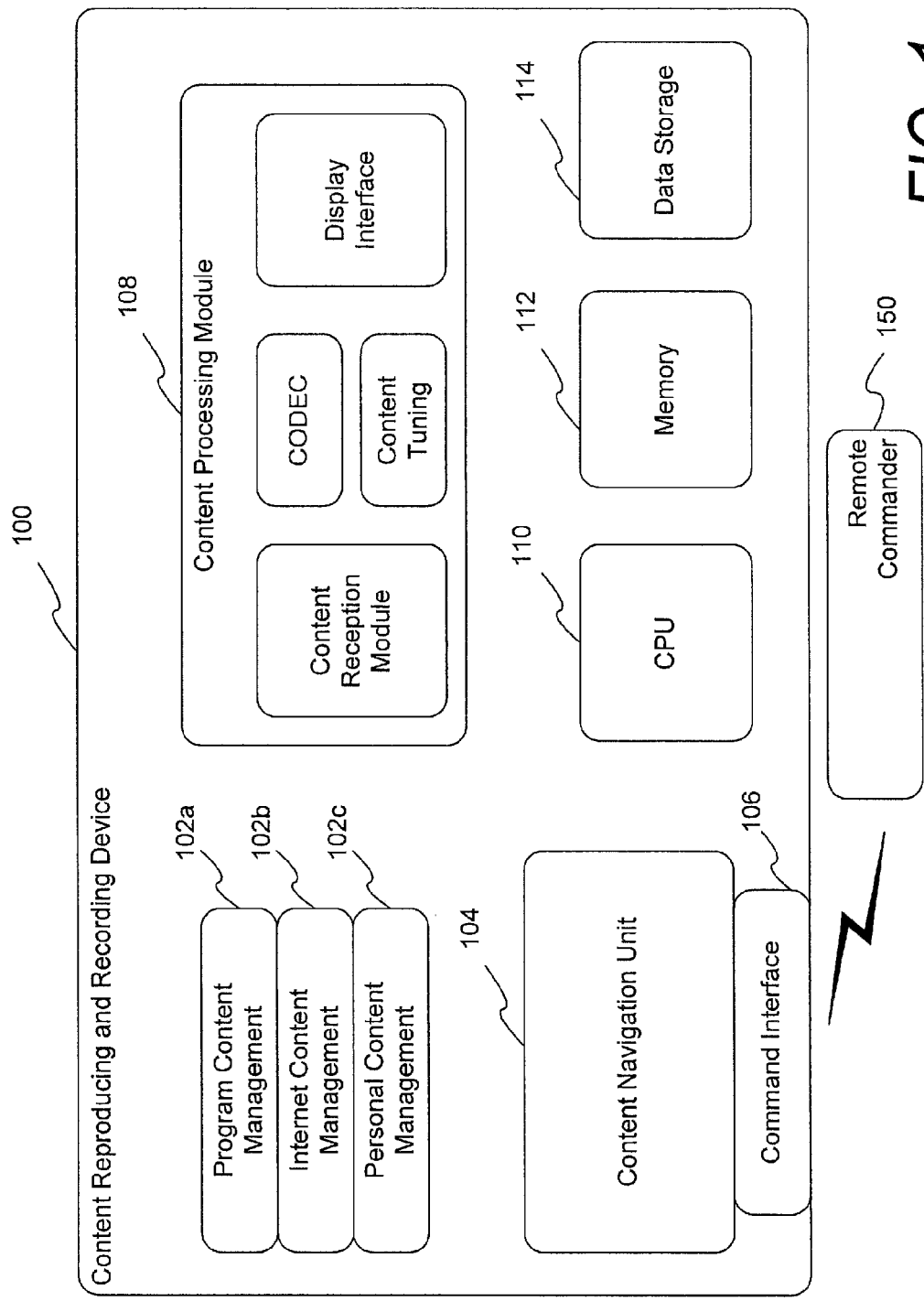
FIG. 1 is a block diagram illustrating a content reproducing and recording device including an example of content navigation.

FIG. 1 is a block diagram illustrating a content recording and reproducing device 100 configured to include content selection and navigation according to one example consistent with the present invention. The content recording and reproducing device 100 may be variously embodied, and in one example may provide a DVR functionality wherein the device is connected to a source of content, and functions to reproduce content for enjoyment, record content for storage and time shifting purposes, and also record personal content, with long term storage being provided via a data storage 114 such as a hard disk. Sources of content include program content, internet content and personal content, respectively managed by the program content management unit 102a, internet content management unit 102b, and personal content management unit 102c.

Although a DVR functionality is described, this is ancillary to the features of selecting and navigating among content items. The content selection and navigation functionality may alternatively be provided in other contexts, including a set top box that does not have a long term recording function, or as an integrated function within a television set, or in various other contexts.

The device 100 is also configured to include a content navigation unit 104 configured to implement one or more aspects of the invention. In the embodiment of FIG. 1, the device 100 includes a content processing module 108 that further includes a content reception module, a codec, a content tuning module, and a display interface. The content reception module is an input module that may accept video input streams in various forms (e.g., National Television Standards Committee (NTSC), PAL, Digital Satellite System (DSS), Digital Broadcast System (DBS), Advanced Television Standards Committee (ATSC), etc.). The streamed content may be based on Moving Pictures Experts Group (MPEG) standards for formatting the digital data stream that can be de-multiplexed and decoded to provide signals appropriate for outputting to any conventional display device. The de-multiplexing and decoding functions may be provided by the noted CODEC and content tuning modules.

The content processing module 108 may thus receive MPEG streams, such as an MPEG2 transport multiplex that supports multiple programs in the same broadcast channel, with multiple video and audio feeds and private data. The output may be various conventional analog and/or digital signals as appropriate for the corresponding display device. For example, the output provided by the display interface may be an analog standard (e.g., NTSC), a digital standard (e.g., ATSC), or both, in embodiments functioning with a conventional analog or digital television. The output may also adhere to computer monitor standards, or any format for driving any type of display.

The device 100 includes both a working memory 112 as well as data storage 114. The memory 112 stores instructions that are executed by the CPU 110 to carry out the functionality described herein. The memory 112 also may buffer content as it is received and decoded, in conjunction with the content being provided as output to the display device. Additionally, larger amounts of content may be concurrently stored in the data storage 114 (e.g., hard disk), or programming may be regularly recorded onto the data storage 114 as part of a scheduled recording.

The device 100 also includes the program content management modules 102a-c that manage content available for display and provide information used to populate display areas from which selection of content or functions may be provided. For example, the program content management unit 102a may manage EPG data to provide the content listings and related information. The EPG data may include guide data, channel identification data, and program data. The guide data is general information, such as the current date and time. Additional information, such as channel list and segment information may also be included in the guide data. The channel identification data includes data relating to channels, such as the channel number, channel name (i.e., the call sign of a broadcast station), logo ID (i.e., an identification of the channel logo), data ID, which is an identification of a channel number of MPEG video data or MPEG audio data, and other information.

The program data includes the program title, start time of the program, time length of the program, program category such as movies, news, sports, etc., program subcategory such as drama, horror, children's for the movies category, or baseball, basketball, football for the sports category, the program rating and a program description that provides a detailed description of the program. The various program entries for each channel may be provided in the sequence with which they are to be shown, or in any desired fashion.

The internet content management unit 102b includes functions for receiving and navigating among various internet content, which may be social networking sites, programming network sites corresponding to displayed programming, and the like, as will be described further below. Conventional browser based navigation and receipt of content may be provided for these features, which may be rendered concurrently with the described program content.

In addition, the system may organize and navigate among personal content such as photographs, videos, photos, and the like. This (and the previously described) content may be stored in the local data storage 114, or may alternatively be maintained in a larger external storage device to which the content reproducing and recording device 100 connects for retrieval of the content. The content units 102a-c are updated according to the available content, regardless of where it is stored, to reflect all of the available content items.

The device 100 also includes a command interface 106 that allows for the receipt of commands from a remote commander 150. The communication channel between the remote commander 150 and the command interface 106 may be any conventional wireless communication, typically implementing an infrared signal but also potentially implementing RF or other technologies.

Figure 2A:
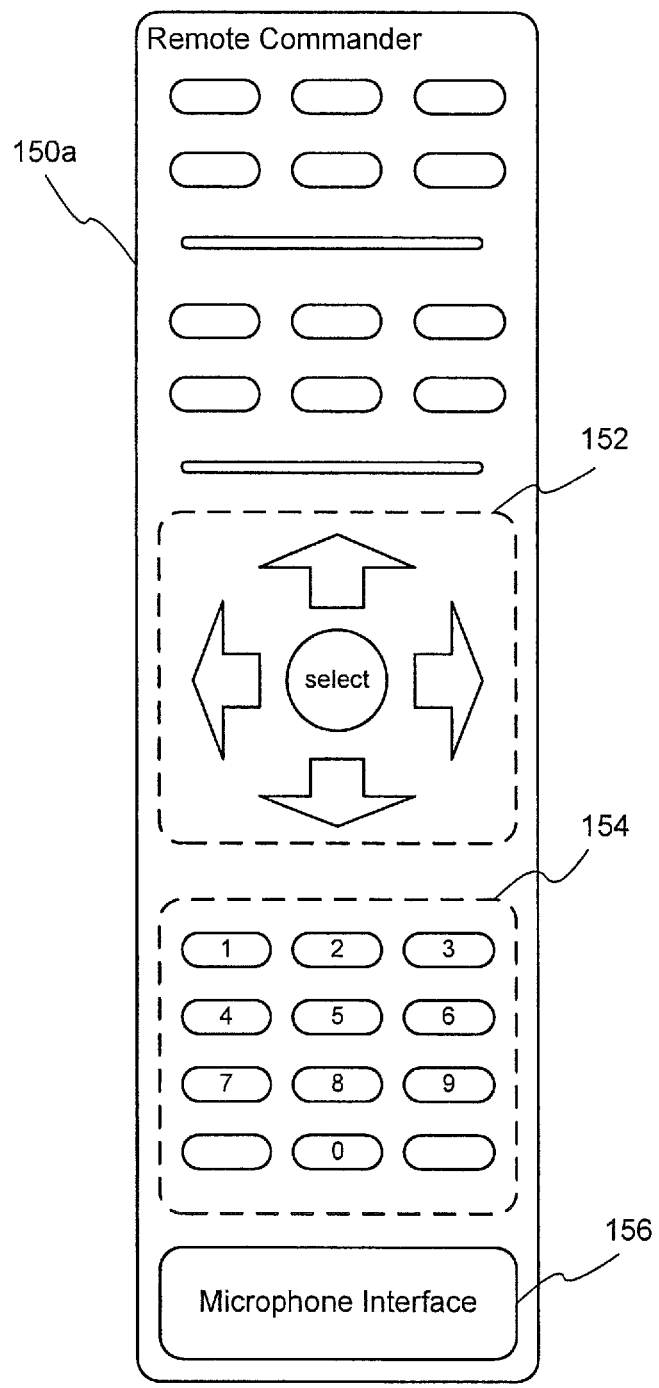
FIG. 2A is a schematic diagram illustrating an example of a remote commander type remote controller, including inputs for content selection and navigation.

The remote commander 150a is configured to include various conventional numerical buttons and navigational (e.g., arrow) buttons that allow the user to send commands that prompt channel selection or navigation among available content. FIG. 2A is a schematic diagram illustrating an example of a remote controller, specifically a remote commander 150a including inputs for cursor navigation and item selection 152 as well as numerical inputs 154 for inputting number commands. For example, a menu list such as the EPG may be displayed, and the user may cursor up or down within the displayed listing, and then press the centrally located "select" button when the cursor resides on a desired content item or item available for selection within a displayed content item (e.g., operations to displayed programming such as record, etc.; hyperlinks to related content; operations to purchase related products; etc.)

The remote commander 150a also may also optionally include a microphone interface 156 for receiving voice commands from a user. Conventional speech recognition technology is used to identify particular commands, such as a spoken number.

In another example, the remote commander 150a may include a biometric interface for receiving commands based upon biometric information of the user, such as fingerprint information. There, a reception area is provided on the remote commander 150a through which the fingerprint information of a user is scanned. In conventional fashion, data corresponding to the fingerprint information is collected and compared to a database of known fingerprint data, which allows users to be identified accordingly. A registration mode wherein users' fingerprints are read and stored for future reference may also be provided. The collection of fingerprint data and the scanning of fingerprints in order to identify users is well known, and need not be described in detail herein for an understanding of this embodiment. It should also be understood that other forms of biometric identification may be provided, including voice recognition, facial recognition, retinal scanning, etc. This biometric information may be used to identify a particular person, so that the selection and display of content items can be tailored according to the identified person.

Figure 2B:
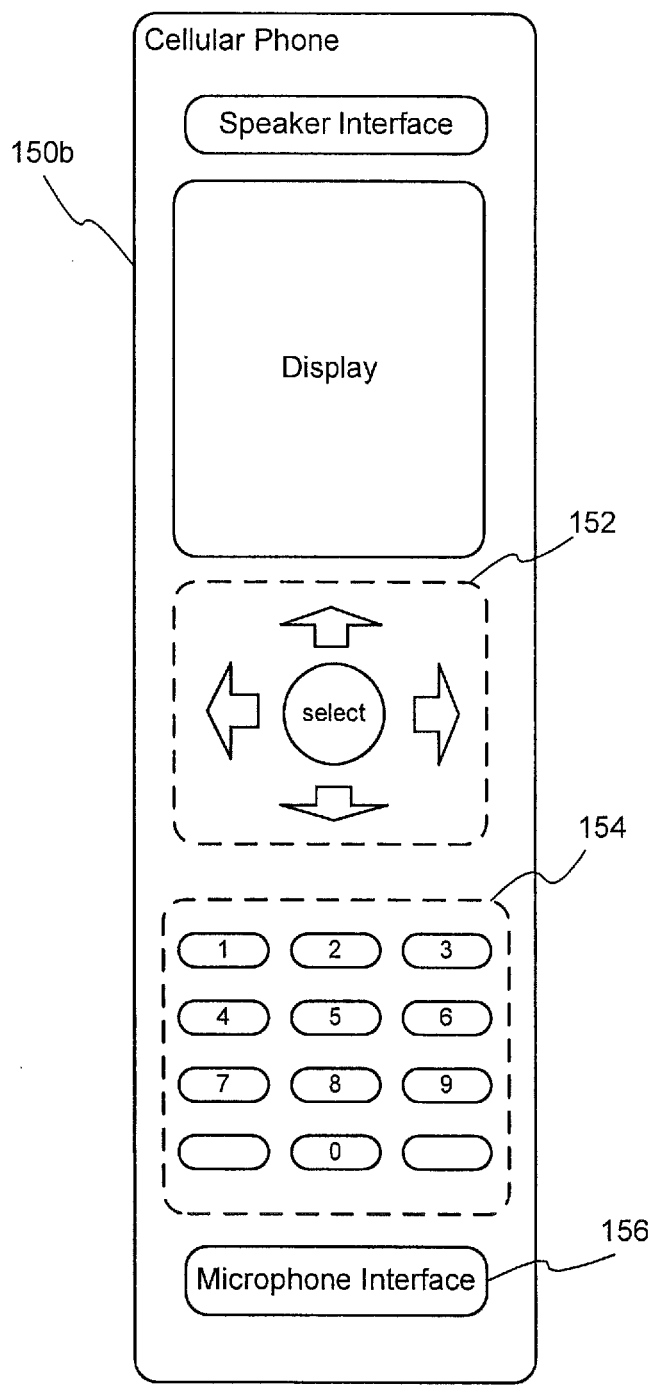
FIG. 2B is a schematic diagram illustrating an example of a cellular phone type remote controller, including inputs for content selection and navigation.

FIG. 2B is a schematic diagram illustrating an example of a cellular phone 150b type remote controller, similarly including inputs for content selection and navigation. Specifically, the cellular phone includes keys for cursor navigation and item selection 152 as well as numerical inputs 154 for inputting number commands, similar to those described above regarding the remote commander 150a. The cellular phone 150b, of course, may include features such as a speaker and display area that are not found on a remote commander 150a, which need not be described herein for an understanding of the invention. In addition to the cellular phone 150b alternative, the keys for cursor navigation and item selection, numerical inputs, and similar functionality may also be provided in other handheld personal devices such as a personal digital assistant (PDA).

The content navigation unit 104 accommodates the management and display of content items, such as within primary and secondary display areas of a display. The content navigation unit 104 is preferably provided as software that is executed by the CPU 110 in order to provide the functionality described herein. Alternatively, the content navigation unit 104 may be provided as hardware or firmware, or any combination of software, hardware and/or firmware. In a software embodiment, the content navigation unit 104 comprises program code that may be stored on computer readable media, and thus provides a computer program product for receiving commands from a remote controller and activating display areas for navigation.

In one embodiment, the content navigation unit 104 is configured to receive commands from a remote controller to allow perusal of content items including commands that allow the user to quickly and easily prompt focusing upon a desired content item into a primary display area within a frame within which multiple content item display areas reside.

Specifically, a display containing such content items may include a primary display area and several secondary display areas. Each of these may contain content items, and may respectively contain related content items.

Figure 3A:
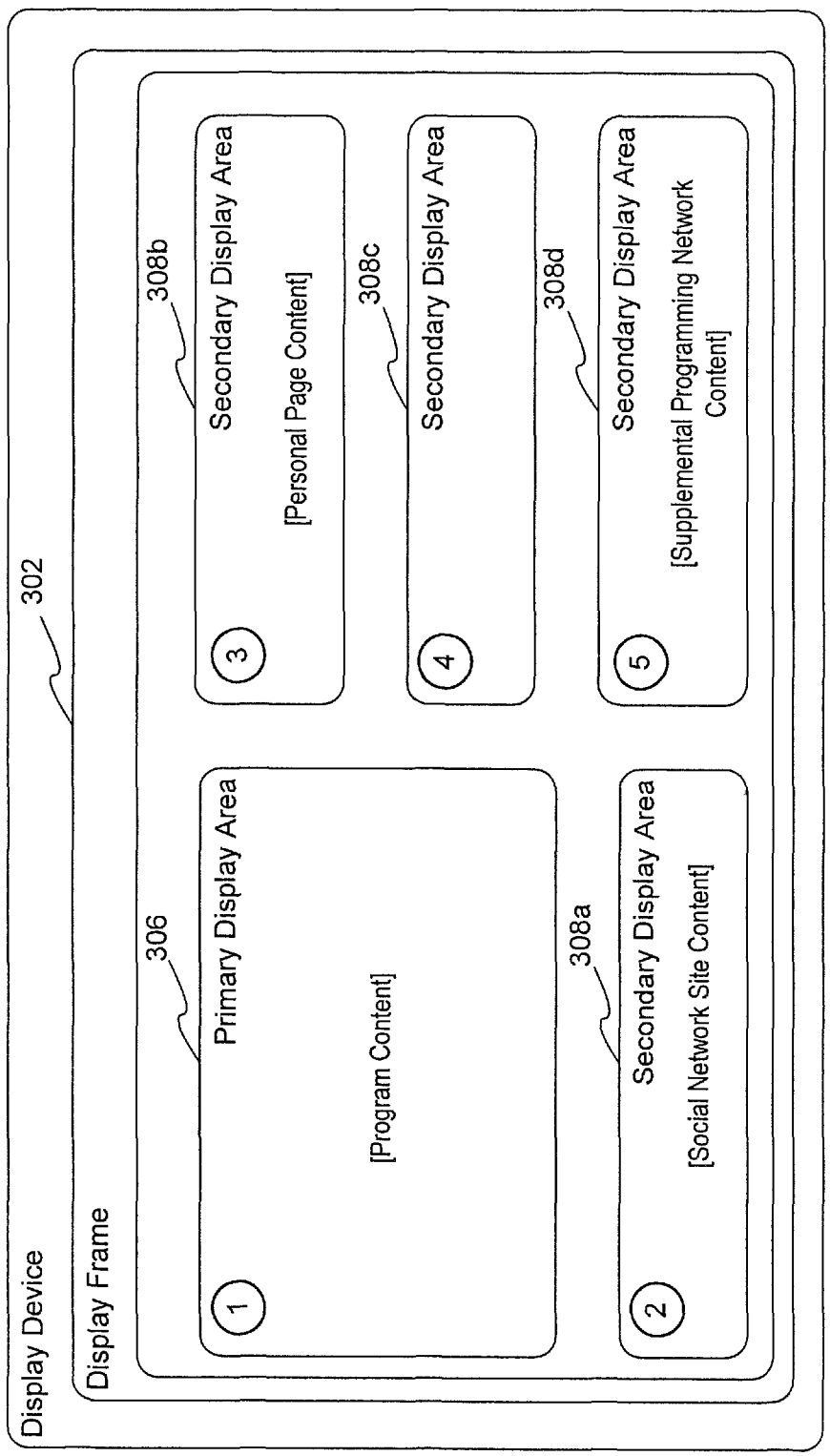
FIG. 3A is a display diagram illustrating an example of primary and secondary display areas subject to content selection and navigation.

Referring to FIG. 1 and FIG. 3A together, FIG. 3A is a display diagram 300a illustrating an example of primary 306 and secondary display areas 308a-d resident within a display frame 302 of a display device.

The content navigation unit 104 dictates the rendering of the primary and second areas within the display frame, as well as the corresponding navigational functionality among the areas, the movement of content items into and out of the primary and secondary areas, and the receipt of commands for initiating such operations.

The primary display area 306 is preferably allocated a greater amount of the display area as compared to the individual secondary display areas.

A variety of different content items are respectively illustrated in the primary 306 and secondary display areas 308a-d. For example, program content such as a regularly scheduled television program may be displayed in the primary display area 306, with various related content items being concurrently displayed in the secondary display areas 308a-d, such as social network site content, personal page content, and supplemental programming network content. Thus, the social networking site location within secondary area 308a could disclose corresponding friends or other matches that are also watching the programming found in the primary display area 306, the personal page content location within secondary area 308b could display a view of the user's personal page while the programming content is being viewed, and a supplemental programming network content location within the secondary area 308d could display corresponding "extras" or the like that a network may provide in conjunction with a particular program, and so on.

Preferably, remote controller functions such as cursor navigation are activated for usage within the primary display area 306. Thus, for example, cursor navigation may be used to focus upon and then browse items within the primary display area 306, using the described navigational arrows or the like, and depression of a select button or the like to engage in selection of a given item. These items may be program listings, links, or any item that may be selected within the primary display area 306.

While cursor navigation is active within the primary display area 306, it is preferably prevented in the secondary display areas 308a-d. Thus, as the user navigates within the primary display area 306, the cursor location is prevented from going into the secondary display areas 308a-d. This allows for focusing upon content items for more clear navigation of that content item within the primary display area 306. Placing a content item into the primary display area 306 may thus also be referred to as focusing on that particular content item.

Figure 3B:
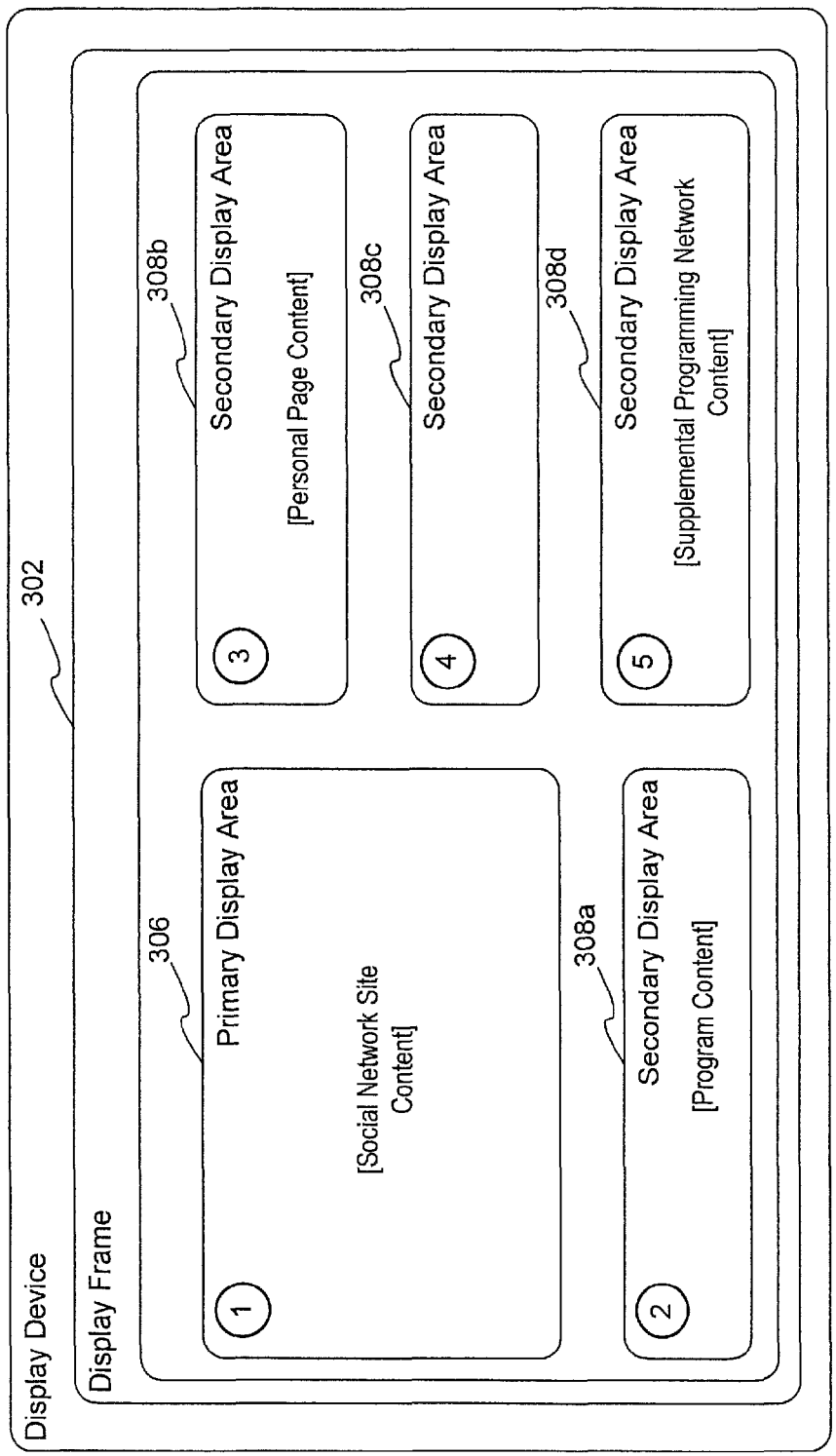
FIG. 3B is a display diagram illustrating the example of FIG. 3A, updated to represent focusing upon a new content item.

As indicated in the display diagram 300a, each of the display areas 306, 308a-d has an associated displayed number found in the upper left hand corner of the display area. These numbers preferably provide a content selection command that is distinct from cursor navigation commands. The content selection command is used to allow a user to automatically prompt focusing upon the corresponding content item so that it is placed into the primary display area 306. Thus, when the number "1" on the remote controller is pressed, the program content automatically is made to reside within the primary display area as shown. If the number "2" is pressed, the rendering of the display frame 302 is automatically updated to locate the content item indicated as [Social Network Site Content] within the primary display area 306, as illustrated in FIG. 3B. Then, the user may use the cursor navigation commands provided by the remote controller to navigate among content of the social network site, with the program content being displayed in the secondary area 308a. The numbers "3", "4" and "5" could respectively correspond to other content items, which can be similarly focused into the primary display area 306.

Thus, in lieu of confusing cursor navigation among the various content items that may reside within a display frame 302, cursor navigation is discretely enabled for only the primary display area 306, and altering which content item resides within the primary display area is separately and clearly provided by dedicated keys such as dedicated numerical input keys on the remote controller.

Figure 3C:
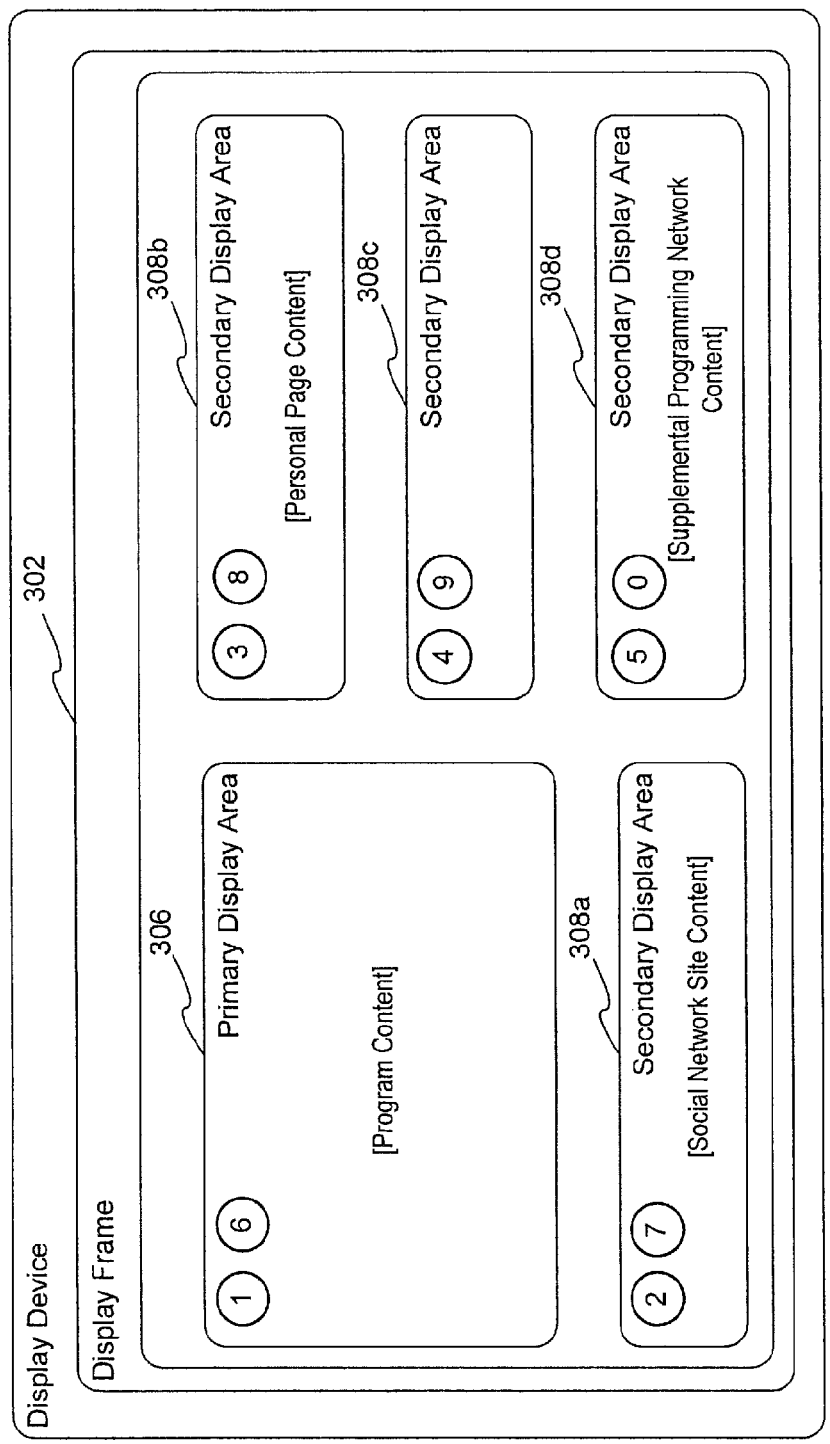
FIG. 3C is a display diagram illustrating another example of primary and secondary display areas subject to content selection and navigation.

FIG. 3C is a display diagram 300c illustrating another example of primary 306 and secondary display areas 308a-d subject to content selection and navigation. In this alternative, the content items are respectively assigned more than one number corresponding to the keypad number input of the remote controller.

The first number provides the content selection command for the assigned content item and the second number activates a supplemental operation for the assigned content item. For example, the supplemental operation may be recording information in the content reproducing and recording device. Thus, for example, the content [Program Content] may be a network broadcast program that the user would like to record. As indicated in the figure, the first number "1" would provide the command to prompt the Program Content to reside in the primary display area 306. The second number "6" may prompt the supplemental operation, such as initiating a recording of the Program Content as described. This allows the user to maintain the existing display frame and to record whichever content item is desired among the many displayed in the display frame, while not disturbing the desired cursor navigation in the primary display area 306. Another example of a supplemental operation may be to launch a select item within a secondary display area 308a-d into another area such as the primary display area 306, as described further below.

There are other alternatives. Other alphanumeric keys on the remote controller may be used for the content selection command that prompts desired content item residence within the primary display area 306. Additionally, the content selection command can be received through speech commands as received either through the remote controller or the content reproducing and recording device. There, the user may simply speak the number of the desired content item, and the rendering of the display frame automatically updates with the desired content item resident within the primary display area 306.

Figure 4A:
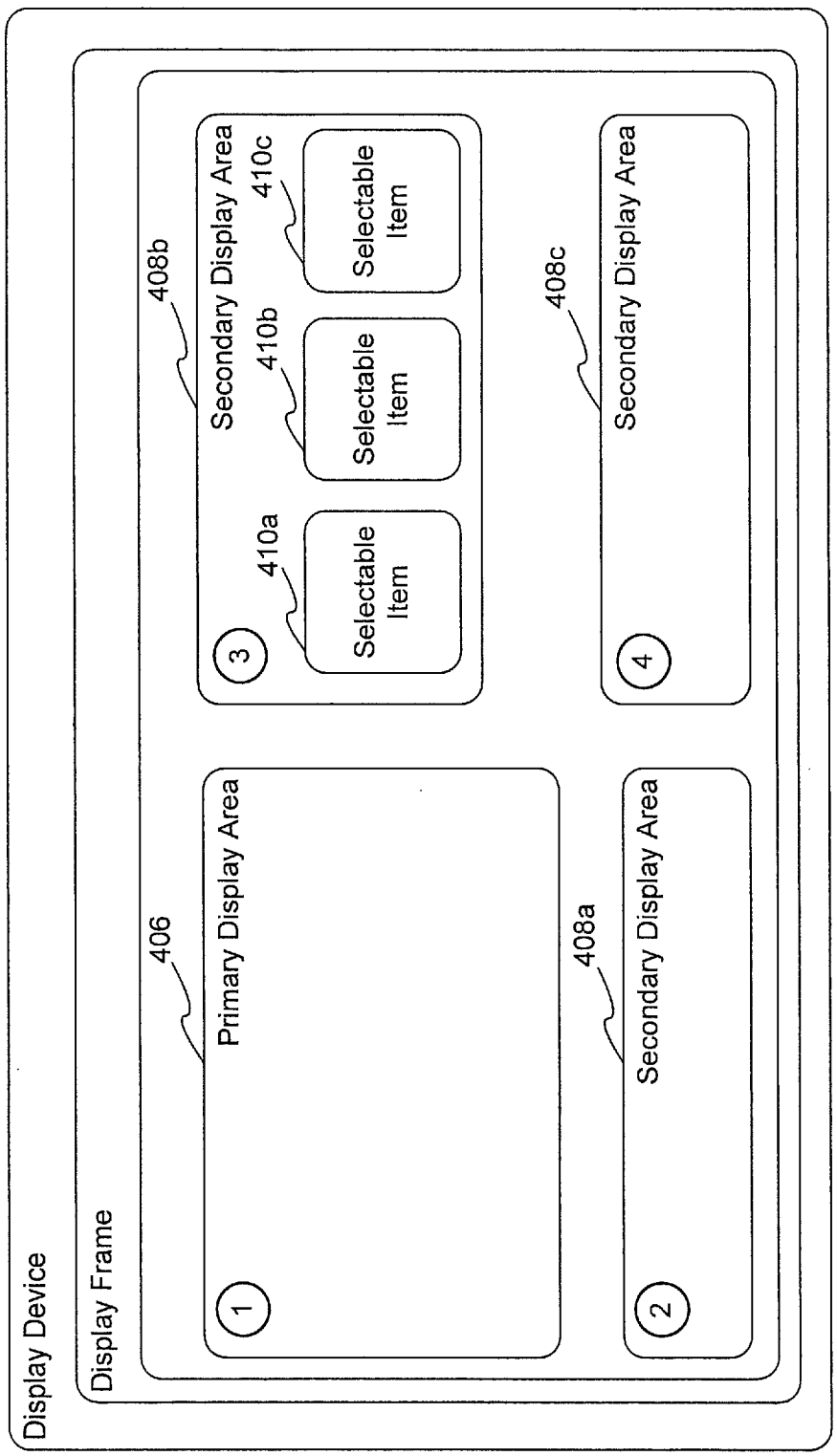
FIG. 4A is a display diagram illustrating another example of primary and secondary display areas subject to content selection and navigation.

FIG. 4A is a display diagram 400a illustrating another example of primary 406 and secondary display areas 408a-c subject to content selection and navigation. In this example, the numerical commands may be used to focus (and thus allow cursor navigation) within the selected display area (primary 406 or secondary 408a-c). It should be noted that although a relatively larger primary display area 406 is preferred, the sizes of the primary and secondary areas in this example may be the same size, and may generically be referred to as display areas.

Still referring to FIG. 4A, the primary 406 and secondary display areas 408a-c respectively include a displayed number in the upper left hand corner of the display area. Similar to the previously described example, receiving a selection of the number from the remote controller corresponding to a given display area prompts focusing upon the display area.

When the display area is focused upon, the cursor moves into that display area and cursor navigation is enabled within that display area, and preferably prevented in the other display areas (i.e., those not currently focused upon). For example, while the display corresponding to FIG. 4A is active, the user may press the number "3" on the remote controller.

Figure 4B:
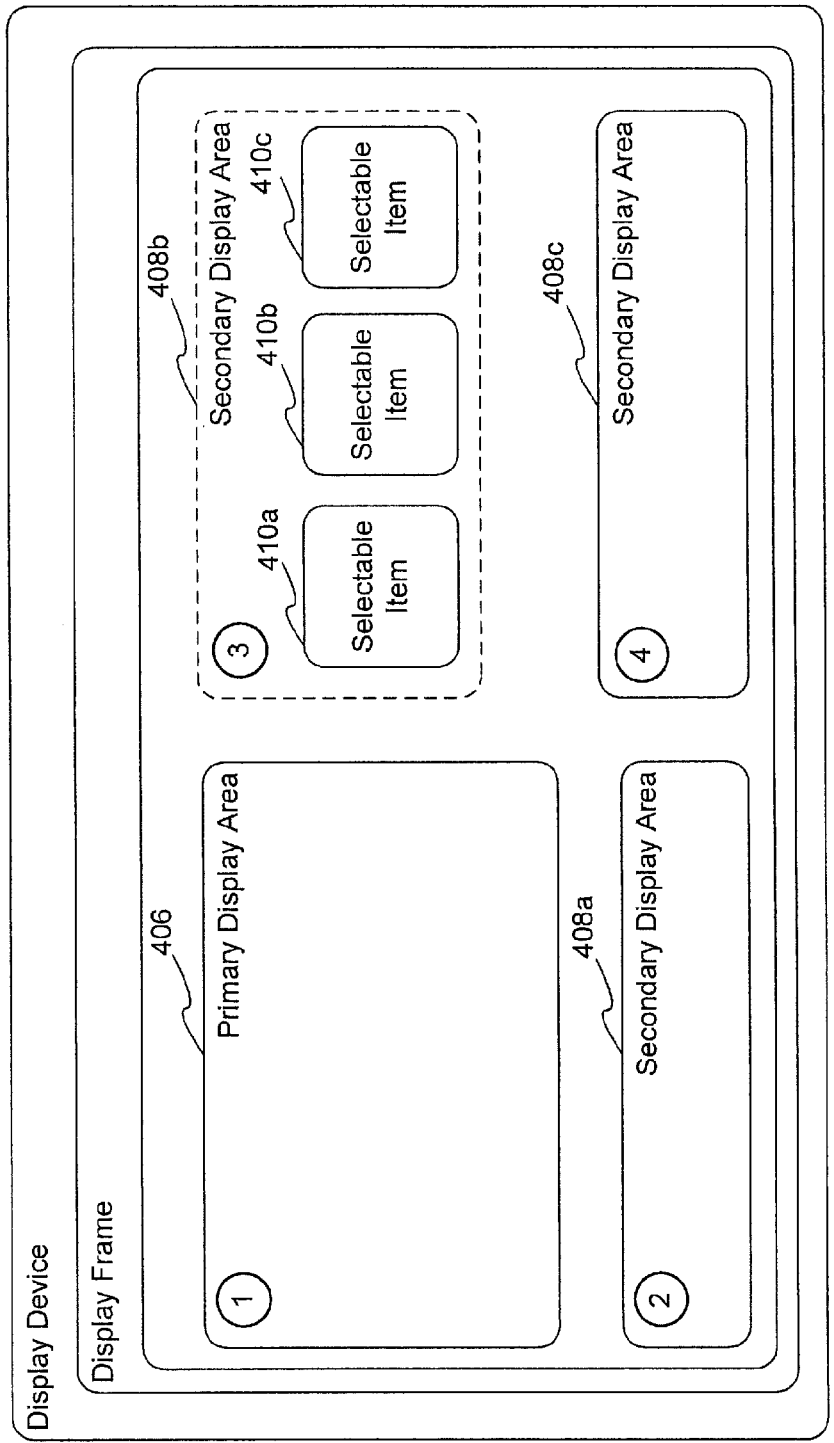
FIG. 4B is a display diagram illustrating the example of FIG. 4A, updated to represent focusing upon a particular secondary display area.
Figure 4C:
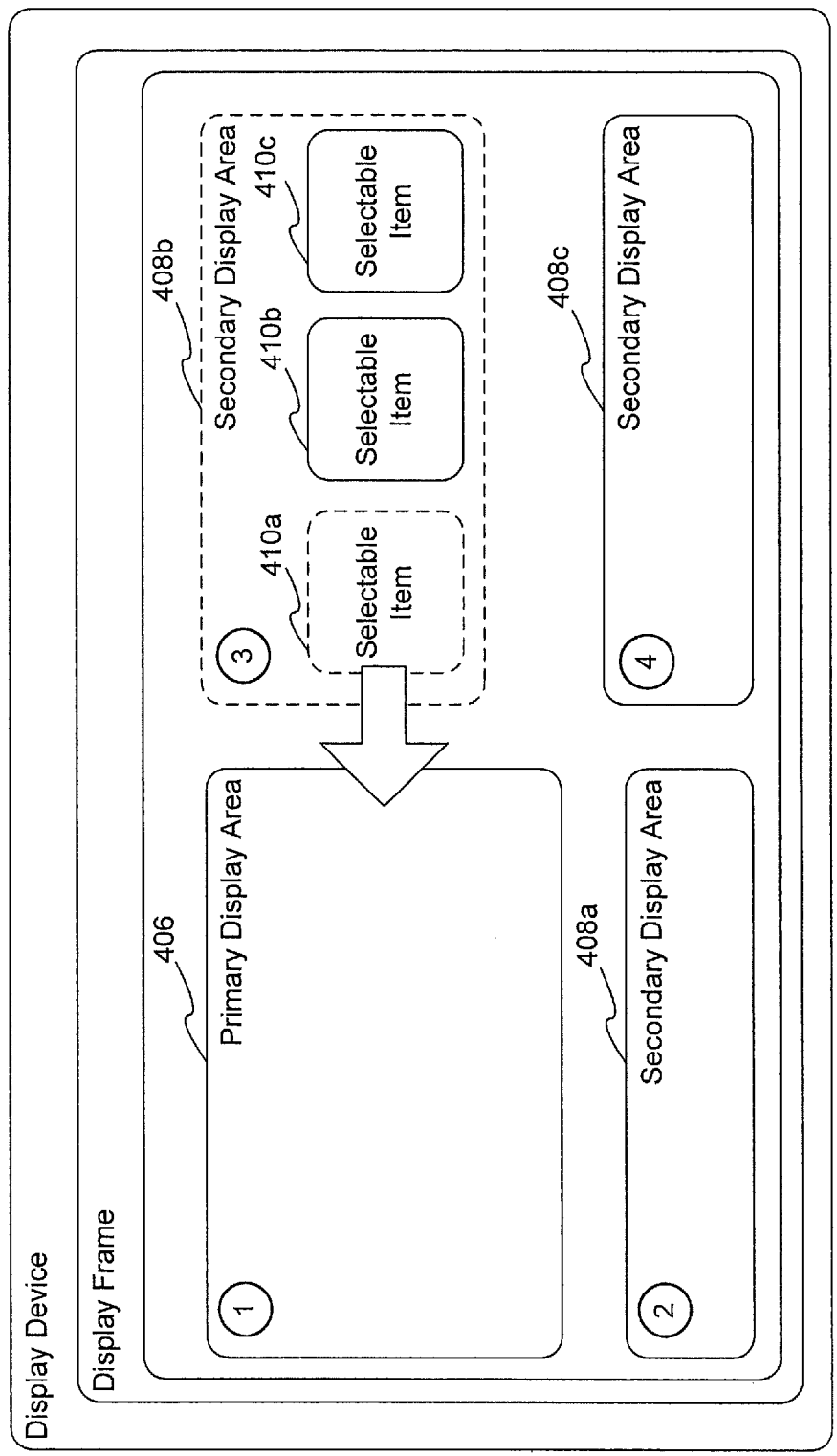
FIG. 4C is a display diagram illustrating the example of FIG. 4A, updated to represent navigation within the particular secondary display area, and selecting a selectable item therein for launching into the primary display area.

FIG. 4B is a display diagram 400b illustrating the example of FIG. 4A, updated to represent focusing upon a particular secondary display area 408b that results upon receipt of the signal indicating that the number "3" had been pressed (indicated as having been focused upon by dotted lines). As indicated in FIGS. 4A-4C, the secondary display area 408b may include any number of selectable items 410a-c. For ease of illustration, selectable items are only shown within secondary area 408b, but they may be included within any of the display areas 406, 408a-c.

The cursor navigational inputs on the remote controller allow the user to navigate within the focused display area (e.g., up, down, left, right), so that the cursor may be moved to reside over any desired selectable item. FIG. 4C is a display diagram 400c updated to represent navigation within the particular secondary display area 408b, with the cursor resident over selectable item 410a (as indicated by the dotted lines).

According to still another aspect of the present invention, while within the focused display area 408b, the user may choose to launch a selectable item into the primary display area 406. This, for example, may be done by moving the cursor onto the desired item and then pressing the select button. The left facing arrow in FIG. 4C offers a conceptual depiction of receiving the select command while the cursor is resident over selectable item 410a.

Figure 4D:
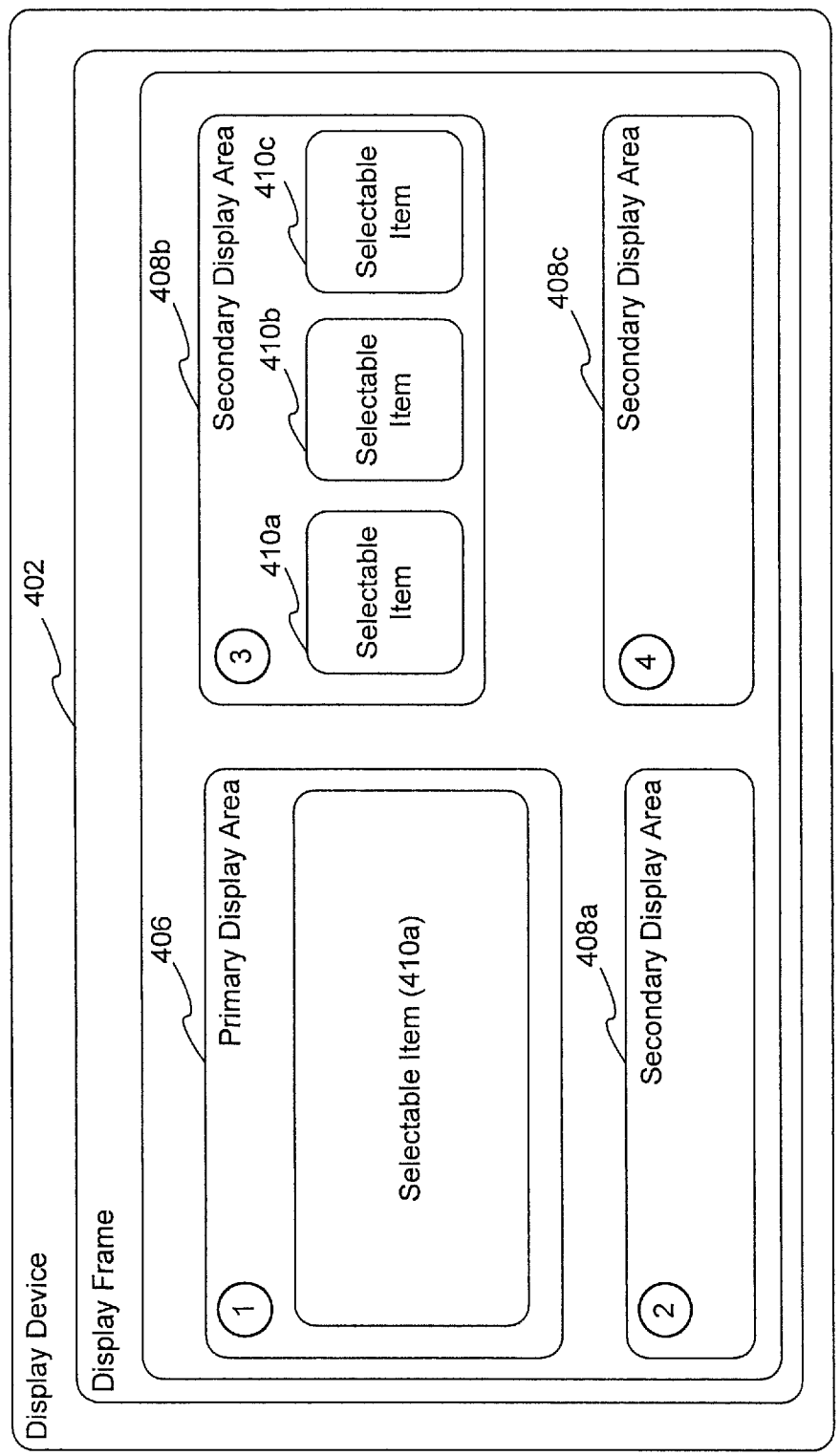
FIG. 4D is a display diagram illustrating the example of FIG. 4A, updated to represent the selectable content item launched within the primary display area.

FIG. 4D is a display diagram 400d updated to represent the selectable content item 410a, now launched within the primary display area 406. It may be preferred to also have the primary display area 406 resume as the display area of focus when this occurs. In this fashion, the user may select any desired secondary display area for focus/navigation, then select a desired item within the focused secondary display area for launching into the primary display area, whereupon the item is automatically focused upon for additional activity within the primary display area. The launched item does not necessarily have to occupy the entire primary display area. For example, it may be rendered along with program content that is playing within the primary display area, if desired.

Figure 5A:
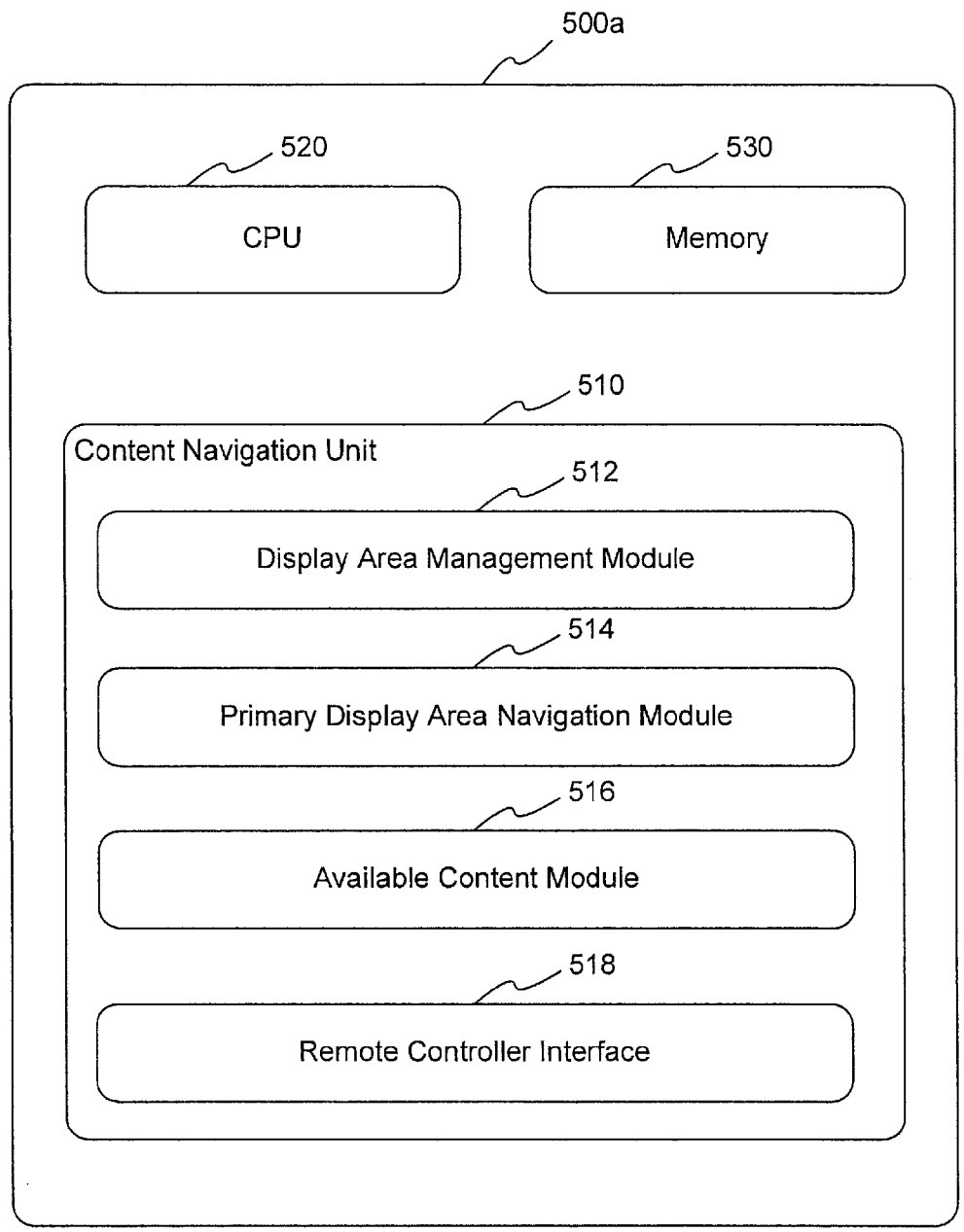
FIG. 5A is a block diagram illustrating an example of a content navigation unit.

FIG. 5A is a block diagram illustrating an example of a computer system 500a including a CPU 520, memory 530, and content navigation unit 510. The content navigation unit 510 is preferably provided as software, but may alternatively be provided as hardware or firmware containing the described components. The CPU 520 executes program code instructions provided by the content navigation unit 510 in order to carry out the described functionality of receiving commands from a remote controller and activating display areas for navigation. Although one modular breakdown is illustrated and described, it should be understood that the described functionality may be provided by greater, fewer or differently named modules.

The content navigation unit 510 includes a display area management module 512, a primary display area navigation module 514, an available content module 516 and a remote controller interface 518.

The display area management module 512 determines which content items are desired for presentation and prompts rendering of the display frame accordingly, with the primary and secondary areas located and sized as desired, such as described above.

The determination of relevant content items may be based upon user preferences that are separately input during a set up mode. This may be accommodated by having the user indicate desired web sites or other content items to be displayed. The rendering of certain areas pertaining to websites may be assisted by technology for maintaining an association of the device (e.g., content recording and reproducing device) with a given user. Thus a social network site personal page particular to a user may automatically be rendered without requiring repeated entry of login credentials, etc.

The determination of relevant content items may also be automatically determined in certain circumstances. For example, certain programming content available from a television network may have predetermined related content items such as a content item pertinent to the network generally or another content item particularly arranged for the program (message boards about the program, etc.) This content may be used to populate one or more of the primary or secondary display areas as well.

The primary display area navigation module 514 includes program code for allowing cursor navigation within the content item displayed in the primary display area, as well as rendering the content item within the primary display area accordingly. It thus manages the receipt of cursor navigation commands as well as the corresponding display of content items and cursor operations within the primary display area.

The available content module 516 communicates with the various content management units such as those in the content reproducing and recording device. The available content module 516 accesses the information maintained in these content management units in order to present content items to the user during both selection (if manual selection is provided) and operational modes. The available content module 416 may maintain a separate database of available content items so as to organize the relationships of content items to be concurrently displayed in primary and secondary display areas.

Finally, the remote controller interface 518 receives commands from the remote controller, recognizes the commands, and passes instructions to the display area management module 512 and the primary display management module 514 to carry out the functionality of cursor navigation of the content item in the primary display area, and updating the primary and secondary display areas based upon receipt of numerical input commands as described.

Figure 5B:
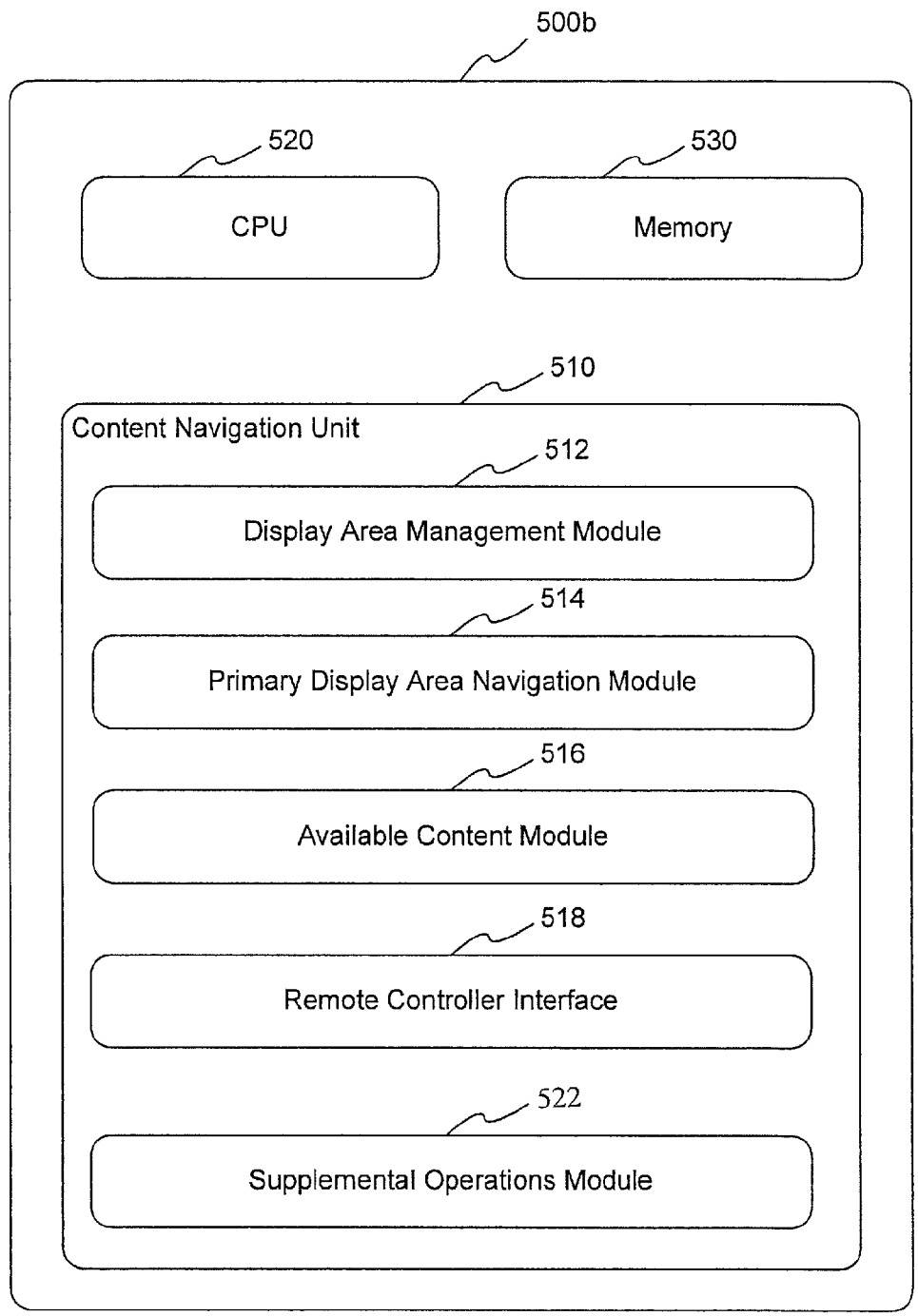
FIG. 5B is a block diagram illustrating an example of another content navigation unit.

FIG. 5B is a block diagram illustrating an example of another computer system 500b having a content navigation unit 510, which is similar to that described in FIG. 5A but also includes a supplemental operations module 522. The supplemental operations module 522 may manage and govern the usage of supplemental operations such as recording content items, sending content items to other users, shopping for related goods or services corresponding to content items, etc. As described above, the supplemental operations may be prompted by additional numerical input commands received from the remote controller. Additionally, the supplemental operations may involve accommodating focusing upon any desired display area to allow cursor navigation therein, and then receiving a selection of an item within the focused display area, and then launching the selected item within the primary display area. This is accommodated by rendering the display areas as described above, receiving navigational commands from the remote controller and responding by moving the cursor over a variety of selectable items, receiving a select command indicating that one of those items has been selected, and then launching the selected item within the primary display area.

Various technologies may be used to render the display areas in appropriate locations, as well as cursor movement and the selection of items, and then launching selected items into desired areas. For example, these features may be implemented on an interactive platform as supported by a set top box, content recording and reproducing device, or the like, which may be based upon HTML and/or Javascript, with rendering capabilities built in, or may be browser based with corresponding functionality provided by applets, controls or the like.

Figure 6:
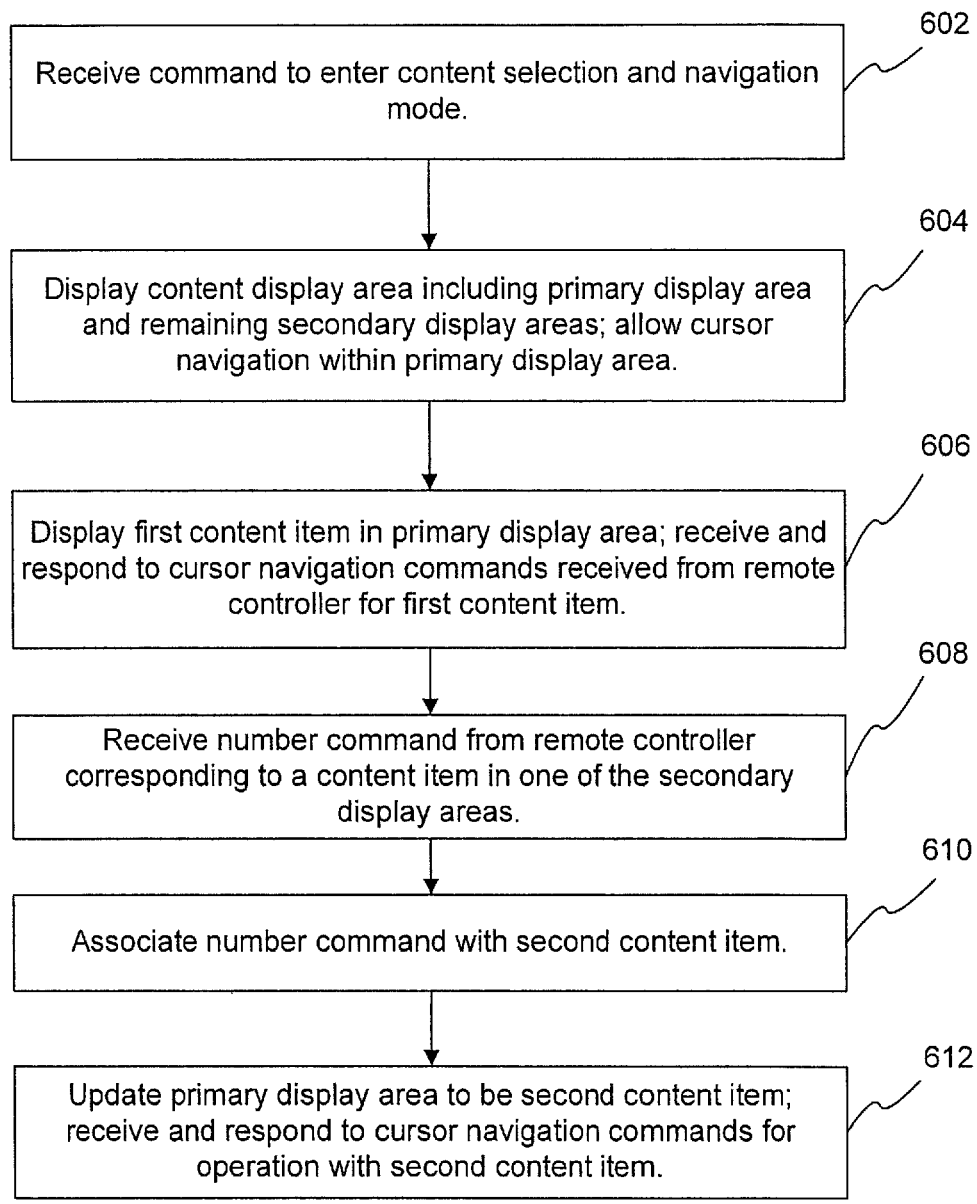
FIG. 6 is a flow diagram illustrating an example of content selection and navigation.

FIG. 6 is a flow diagram illustrating an example process 600 of receiving commands from a remote controller and activating display areas for navigation. The process 600 is preferably a computer implemented process with corresponding receipt of commands and rendering of displays as described above.

The process 600 commences with receipt 602 of a command to enter the content item selection and navigation mode of operation. This may, for example, be accommodated by receiving a command from a dedicated key found on the remote controller. Once in this mode, the content display area (display frame) is configured to display 604 the primary and secondary display areas as described. Cursor navigation is allowed in the primary display area and may be prevented in the secondary display areas.

One of the content items is displayed 606 in the primary display area, such as program content, a program guide, a social network site, etc. The particular content item that is currently focused upon and thus found in the primary display area can be navigated using cursor based navigation, corresponding to navigational commands received via remote controller operation.

As described and as illustrated in FIGS. 3A-C above, each of the content items has a corresponding assigned number that is preferably displayed along with the content item for easy user-association of the number to the content item.

While the content selection and navigation mode is active, when a particular number command is received 608 from the remote controller and is associated 610 with one of the content items, the primary display area is updated 612 such that the associated content item is displayed therein, with cursor navigation commands then being applicable only to the new content item displayed in the primary display area. As noted above, in addition to remote controller key inputs, a voice command (e.g., of the same number as shown on the display) may alternatively be used to prompt changes to the content item to be displayed in the primary display area.

Figure 7:
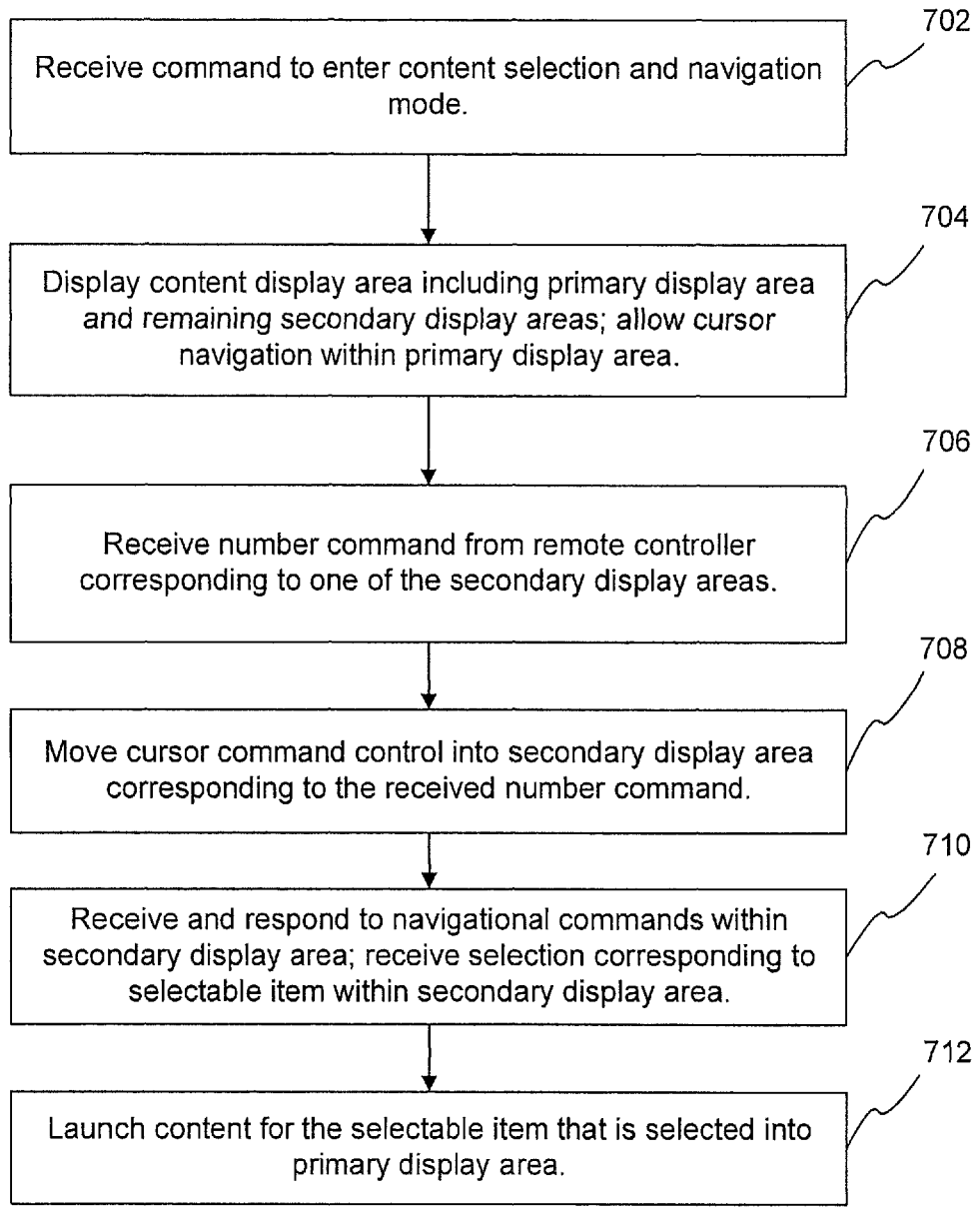
FIG. 7 is a flow diagram illustrating another example of content selection and navigation.

FIG. 7 is a flow diagram illustrating an example process 700 of receiving commands from a remote controller and activating display areas for navigation. The process 700 is preferably a computer implemented process with corresponding receipt of commands and rendering of displays as described above, more particularly in connection with FIGS. 4A-D.

The process 700 similarly entails receiving 702 a command to enter the content selection and navigation mode, which results in a starting display with primary and secondary display areas such as shown in FIG. 4A. This may initially involve displaying 704 the content display area and secondary display areas, with initial focus and thus cursor navigation being provided within the primary display area.

A number command is then received 706 from the remote controller corresponding to one of the secondary display areas, whereupon the focus is shifted to the desired display area. This entails moving 708 the cursor command control to within the secondary display control matching the input number. Once this occurs, the unit receives and responds 710 to navigational commands to move a cursor about the secondary display area and a variety of selectable content items found therein. When the cursor resides over a desired item, a command (e.g., select) on the remote controller may then be used to launch 712 the corresponding item into the primary display area.

Figure 8:
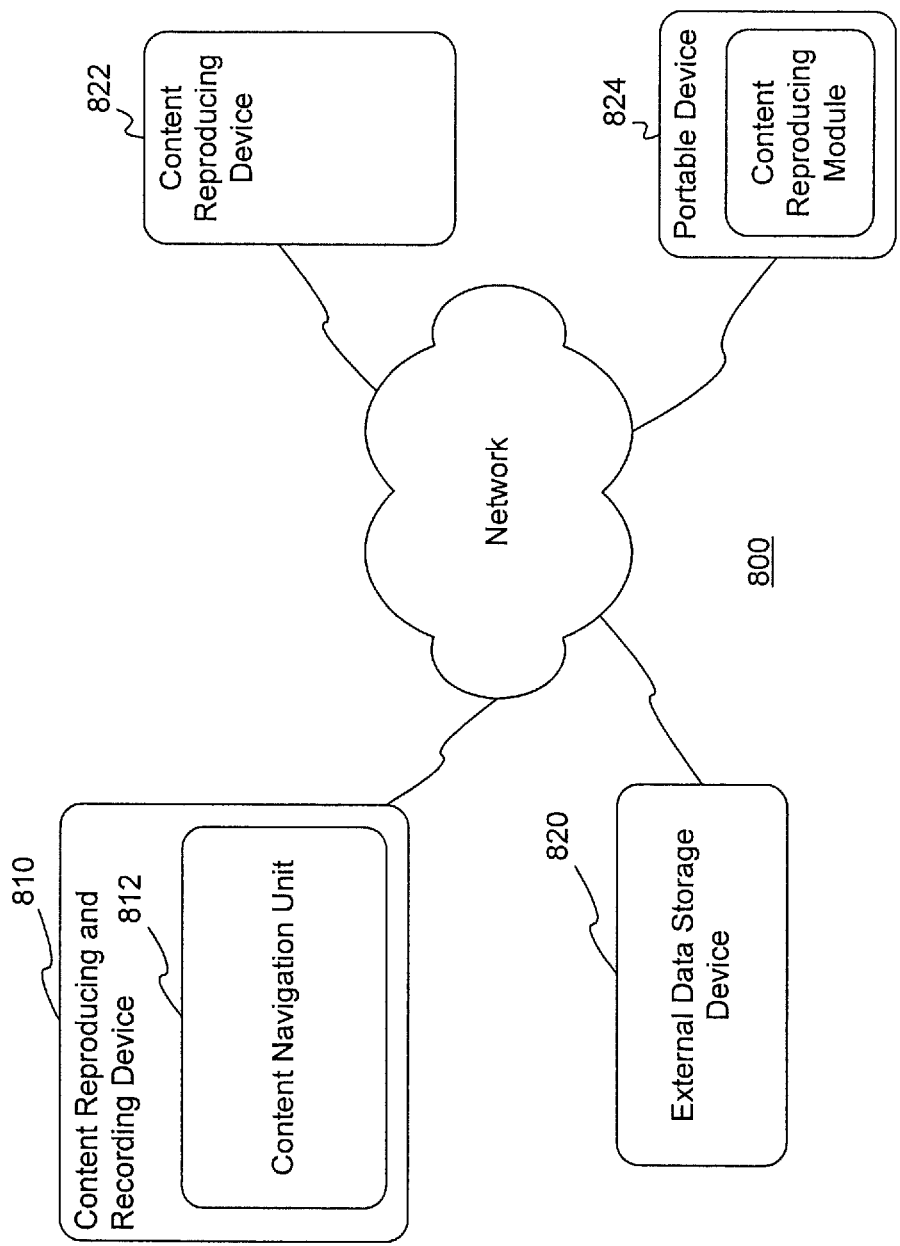
FIG. 8 is a schematic diagram illustrating an example of a network in which content selection and navigation operates.

FIG. 8 is a schematic diagram illustrating an example of a network 800 in which content selection and navigation may operate. The content reproducing and recording device 810 is configured to include a content navigation unit 812 as described above.

Network communications with other devices such as an external storage device 820, content reproducing device 822 or portable device 824 may be made between the content reproducing and recording device 810 and those devices in conventional fashion.

The supplemental operations described above as being initiated by a second numerical association with a content item may thus involve not only supplemental operations provided by the content reproducing and recording device 810, but also these other network connected devices 820-824. Thus, the user may opt to push content items to these other devices for current or subsequent enjoyment, or the like, through simple remote controller key based commands.

Thus embodiments of the present invention produce and provide receiving commands from a remote controller and activating display areas for navigation. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A display device for receiving commands from a remote controller and activating display areas for navigation, comprising:
   a display that concurrently displays a plurality of content display areas, the plurality of content display areas respectively corresponding to a plurality of content items, the plurality of content display areas including a primary display area wherein cursor navigation is activated and secondary display areas wherein cursor navigation is prevented;
   a processor that causes a first content item to be resident within the primary display area such that cursor navigation is active for the first content item; and
   an interface for receiving from the remote controller a content selection command that is distinct from cursor navigation commands, the content selection command being received while cursor navigation remains active for the first content item,
   wherein the processor is configured to recognize the content selection command as corresponding to a second content item, and thereby causing the second content item to be resident within the primary display area such that cursor navigation is active for the second content item.

2. The display device of claim 1, wherein the content selection command is sent from a dedicated numerical input of the remote controller.

3. The display device of claim 2, wherein the plurality of content items are respectively assigned a plurality of numbers corresponding to the keypad number input of the remote controller, wherein a first number provides the content selection command for the assigned content item and the second number activates a supplemental operation for the assigned content item.

4. The display device of claim 1, wherein the content selection command is a number that is recognized based upon received speech commands.

5. The display device of claim 4, wherein cursor navigation corresponds to dedicated cursor inputs of the remote controller.

6. The display device of claim 1, wherein cursor navigation corresponds to dedicated cursor inputs of a remote controller and the content selection command corresponds to a dedicated numerical input of the remote controller.

7. The display device of claim 1, wherein the plurality of content items are respectively assigned a plurality of numbers corresponding to the keypad number input of the remote controller, wherein a first number provides the content selection command for the assigned content item and the second number activates a supplemental operation for the assigned content item.

8. The display device of claim 1, wherein the display device is a television.

9. A display device for receiving commands from an interface and activating display areas for navigation, comprising:
   a display that concurrently displays a plurality of content display areas, the plurality of content display areas respectively corresponding to a plurality of content items, the plurality of content display areas including a primary display area wherein cursor navigation is activated and secondary display areas wherein cursor navigation is prevented;
   a processor that causes a first content item to be resident within the primary display area such that cursor navigation is active for the first content item; and
   the interface for receiving a content selection command that is distinct from cursor navigation commands, the content selection command being received while cursor navigation remains active for the first content item,
   wherein the processor is configured to recognize the content selection command as corresponding to a second content item, and thereby causing the second content item to be resident within the primary display area such that cursor navigation is active for the second content item.

10. The display device of claim 9, wherein the interface is a biometric user interface integrated with the display.

11. The display device of claim 10, wherein the content selection command is received through the biometric user interface when a finger touches the portion of the display that contains the integrated biometric user interface integrated and corresponds to the second content item.

12. The display device of claim 9, wherein the display device is a television.

13. A user interface displayed by a display of an electronic device that processes commands that activates display areas of the display for navigation, comprising:
   a plurality of content display areas respectively corresponding to a plurality of content items that are concurrently displayed by the display, where at least one of the plurality of content display areas is designated as a first focused display area and at least one of the remaining plurality of content display areas is designated a second focused display area;
   a cursor that navigates in the first focused display area while being prevented by the user interface to navigate in the remaining content display areas; and an input section that receives and associates an input command to one of the remaining content display areas; and wherein when the input command is received by the input section the cursor moves to and navigates in the second focused display area while being prevented to navigate in any of the other content display areas.

14. The method of claim 13, wherein the plurality of content display areas comprise a primary display area and secondary display areas.

15. The method of claim 14, further comprising:

the input section that receives a selection command corresponding to a selectable item within the second focused display area, the second focused display area being one of the secondary display areas; and launching content corresponding the selectable item within the primary display area.

* * * * *